United States Patent

[11] 3,619,067

| [72] | Inventors | Bradford Howland<br>Cambridge;<br>Arthur F. Proll, Newburyport, both of Mass. |
|---|---|---|
| [21] | Appl. No. | 4,154 |
| [22] | Filed | Jan. 19, 1970 |
| [45] | Patented | Nov. 9, 1971 |
| [73] | Assignee | Massachusetts Institute of Technology<br>Cambridge, Mass. |

[54] METHOD AND APPARATUS FOR DETERMINING OPTICAL FOCAL DISTANCE
17 Claims, 4 Drawing Figs.

[52] U.S. Cl. .................................................. 356/125, 350/96
[51] Int. Cl. ..................................................... G01b 9/00, G02b 5/14
[50] Field of Search .......................................... 350/96 B; 250/227; 356/124–127

[56] References Cited
UNITED STATES PATENTS

| 3,215,135 | 11/1965 | Franke ........................ | 350/96 X |
| 3,356,854 | 12/1967 | Humphrey .................... | 250/227 |
| 3,447,874 | 6/1969 | Back ........................... | 356/124 |

Primary Examiner—Ronald L. Wibert
Assistant Examiner—Conrad Clark
Attorneys—Thomas Cooch, Richard F. Benway and Robert T. Dunn ABSTRACT: The location of the focal surface of a lens system is precisely determined, using a retroreflector on one side of the lens system and a bifurcated light guide of intermixed fibers on the other side, with one set of the light guide fibers leading to a source of light and another set leading to a light detector. The bifurcated light guide is moved relative to the lens system and the position which results in a minimum of light output to the detector determines precisely the location of the focal surface of the lens system.

INVENTOR.
BRADFORD HOWLAND
ARTHUR F. PROLL

METHOD AND APPARATUS FOR DETERMINING OPTICAL FOCAL DISTANCE

The present invention relates to method and apparatus for determining the location of the focal surface of a lens system and has application, for example, to focusing a camera.

The focal distance of a lens system, usually defined as the distance from the lens system flange to the lens focal plane along the optical axis of the system, is usually measured using optical benches, autocollimators, and other spacial purpose apparatus. Some techniques attempt to distinguish the sharpness of and image, as for example by viewing the image on a ground glass with a medium-power microscope or by determining the sharpness at the edge of an image by detecting the change in illumination of a light probe, which moves across the edge of an image. This latter method usually requires that the light probe be moved across the edge of the image rapidly so that the amount of light falling upon the probe fluctuates rapidly. The magnitude of the excursions of the intensity of light falling on the probe provide an indication of the sharpness of the edge of the image. Clearly, such techniques require a high degree of calibration in order to be able to interpret the amplitude of the fluctuations.

It is one object of the present invention to provide a method and apparatus for determining the location of the focal plane of a lens system and one which is free of observational errors and calibration errors intrinsic in prior techniques.

It is another object to provide a method and apparatus for precisely focusing a camera.

It is another object of the present invention to provide method and apparatus for measuring the spherical aberration of a lens system.

It is another object to provide a method and apparatus for measuring a chromatic aberration of a lens system.

In accordance with a principal feature of the present invention, an illuminated planar object is provided along the optical axis of the subject lens system on one side thereof. On the other side of the lens system along the axis is a reflector which reflects light from one path to a parallel oppositely directed path, more specifically, a corner-cube retroreflector, and so if the object is located precisely at the focal plane of the lens system, an image of the same object will be formed precisely on top of the object. On the other hand, if he object is not precisely at the focal surface, the image formed by rays returned through the lens by the retroreflector will not be in registration with the object, and so the light defining the image which does not fall upon the object can be gathered and detected and the intensity of this light measured. When the intensity of the light is a minimum, the significance is that the object is located precisely and at the focal surface along the optical axis of the lens system. Specific embodiments of the invention described herein employ a bifurcated light guide consisting of a bundle of randomly intermixed, light-transmitting fibers, the end of which is moved along the optical axis of the lens system until it is contiguous with the focal surface of the lens system and when precisely contiguous the detected light is at a nadir and so the focal surface of the lens system is precisely defined.

Other features and objects of the invention will be apparent in view of the specific description, taken in conjunctions with the figures, in which.

Figure 1:
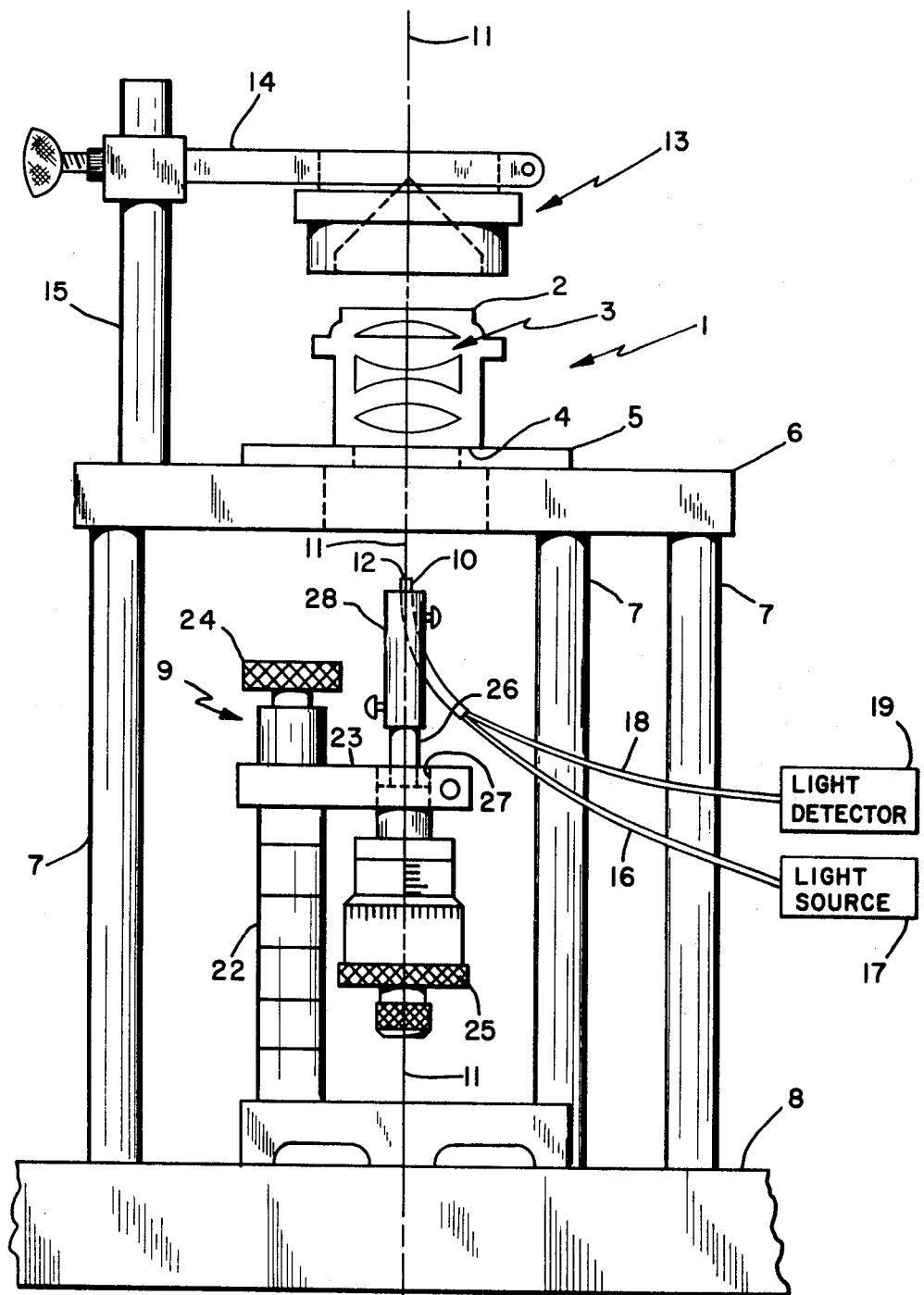
FIG. 1 is a front view of apparatus for determining the focal distance of a subject lens system for which the conjugate focus is at infinity.
Figure 3:
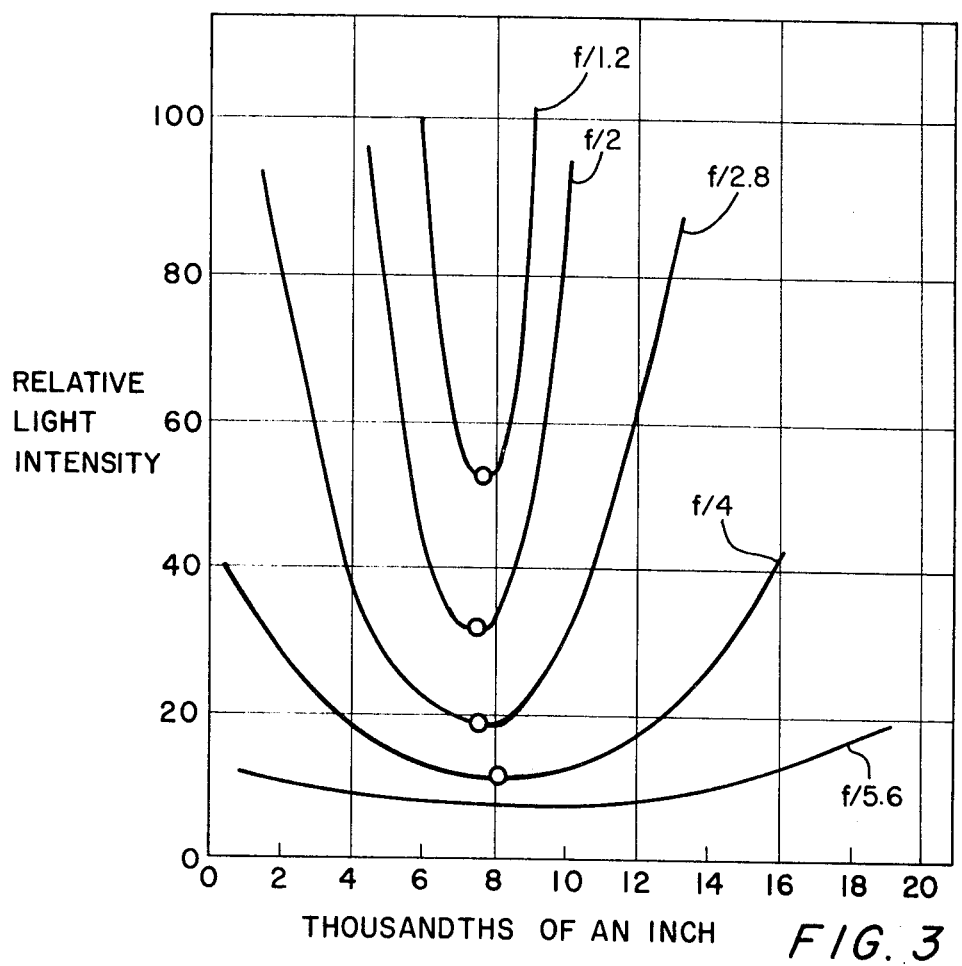
Figure 4:
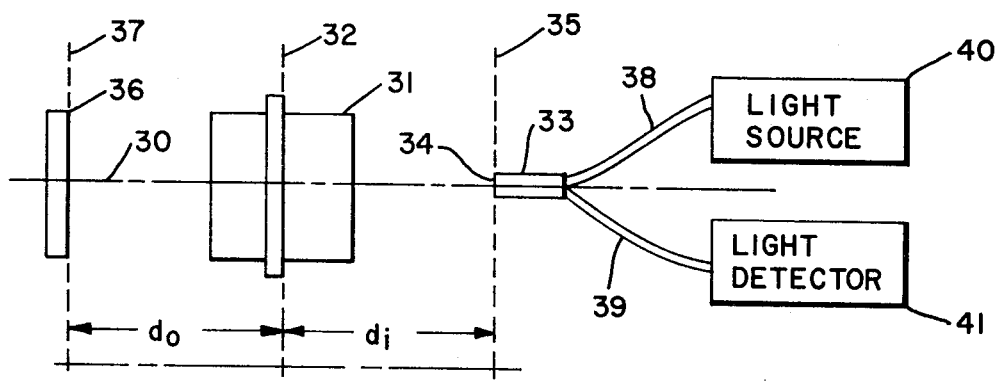

FIG. 3 includes a family of plots of the position of the end of the bifurcated light guide versus the relative intensity of the light detected for a subject lens system which has a 50-millimeter aperture and the $f$ number indicated; and FIG. 4 illustrates schematically apparatus similar to that shown in FIG. 1, for determining the focal distance of a subject lens system employing a mirror, in place of the corner-cube retroreflector shown in FIG. 1.

Generally, a lens system consists of the package of a number of individual optical lens elements. The focal distance is the distance from the lens system to the focal plane along the axis of the lens system. This distance is measured from the flange of the lens system to the focal plane and so it is termed the flange focal distance.

The position of the focal surface of a given lens system depends upon the selected position for the conjugate focal surface. More particularly, the position of the focal surface where an image is formed depends upon the position of the object relative to the lens system. The focal distance of a lens system is usually expressed as the distance between focal surface and the lens system flange for the case of the conjugate focus at infinity (object at infinity). The specification of a lens system usually gives the focal distance with the conjugate focus at infinity. The present invention teaches method and apparatus for measuring this focal distance for a lens system. The apparatus shown in FIG. 1 serves to determine this focal distance for a subject lens system. THe apparatus includes a retroreflector on one side of the lens system and a bifurcated light guide on the other side, constructed and operated as described herein.

In a camera, a lens system focuses an image of an object located an arbitrary distance from the lens system, upon film which defines the focal surface of the lens system. FIG. 4 illustrates an application of features of the present invention for accomplishing this. Here a plane mirror is located at the position of the object and the bifurcated light guide is located at the position of the film. The focal length and/or position of the lens system is varied while detecting the intensity of light at the detector. When a nadir in the intensity occurs, the focal surface for a given object distance is found and so the lens system is adjusted to precisely focus the given object distance upon the film.

Turning first to FIG. 1, there is shown apparatus in a vertical arrangement for determining the focal distance of a subject lens system 1. The lens system includes a housing 2 containing one or more optical lenses 3 and attached to a lens system flange 4. The lens system is mounted as follows: the lens flange 4 is supported by an adapter ring 5, specifically machined to fit the requirement of the lens system. This adapter ring, in turn, is supported by a precision ring stand consisting of a plate 6, supported by columns 7, which are preferably stacks of gage blocks rising from a surface plate 8. Between the two plates 6 and 8 and mounted to the surface plate 8 is an adjustable stand 9 for holding the bifurcated fiber optic light guide 10 at a position along the optical axis 11 of the lens system, so that in operation the end 12 of the bifurcated light guide held with the surface thereof centered and perpendicular to the optical axis 11 can be moved along the axis and the position of this surface relative to the flange of the optical system precisely measured by noting the setting of the adjustable stand 9. The end 12 is ground and polished optically flat and appears as illustrated enlarged in FIG. 2.

On the other side of the lens system, along the optical axis 11 is located a retroreflector prism 13, which is held by an arm 14 positioned along the vertical rod 15 attached to the plate 6.

One set of fibers 16 from the bifurcated light guide leads to a source of light 17. Another set of fibers 18 leads to a light detector 19, which is preferably a photomultiplier.

In operation, the position of the end surface 12 of the bifurcated light guide 10 along the optical axis of the lens system is varied and the output from the light detector 19 is noted. When the output reaches a nadir (the intensity of light detected reaches a minimum), then the position of the surface 12 of the light guide relative to the flange of the lens system is measured. This gives a measure of the focal distance or distance of the focal surface of the lens system from the lens system flange, when the conjugate focus is at infinity.

The measurement is facilitated with the variable stand 9. This consists of a base 21 to which a calibrated bar 22 is rigidly attached. Along this bar 22, a cross bar 23 is positioned by turning the knurled knob 24. Rigidly attached to the crossbar 23 is a micrometer 25. The nonrotating output rod 26 of the micrometer extends upward through an opening 27 in the crossbar and the bifurcated light guide is attached to this rod by a suitable adapter flange 28. The adjustable stand is calibrated so that the position of the end surface 11 of the light guide relative to the flange 4 of the lens system is precisely determined in terms of the micrometer setting. This can be accomplished as follows: with the micrometer set in its uppermost position, corresponding in this case to a scale reading of zero, measurements are taken of (1) the height above the surface plate 8 of the ground and polished end surface 12 of the bifurcated fiber optic light guide, and (2) the height above the surface 8 of the top surface of the adapter ring 5. (These measurements are precision measurements using surface plate measurement techniques well known to the field of dimensional metrology.) The algebraic difference between these two measurements is equal to $\Delta$. Thereafter, the micrometer is operated while noting the intensity of light detected to find the position which produces the nadir. The reading on the micrometer at this point is added to the measured distance $\Delta$ to give the precise flange focal distance for the lens system when the conjugate focus is at infinity.

The bifurcated fiber optic light guide 10 is prepared by randomly intermixing as thoroughly as possible two sets of glass fibers. These sets are epoxied into metal mounts and the end surfaces at 12 are ground and polished flat. The light guide 12 is held in the steel adapter 28 by setscrews. When the end surface 12 is located coincident with the focal plane of the lens system, the action of the lens and retroreflector is such as to reimage the illuminated fibers back onto themselves. The illuminated light fibers are those which from the set 16 that leads to the light source 17.

Figure 2:
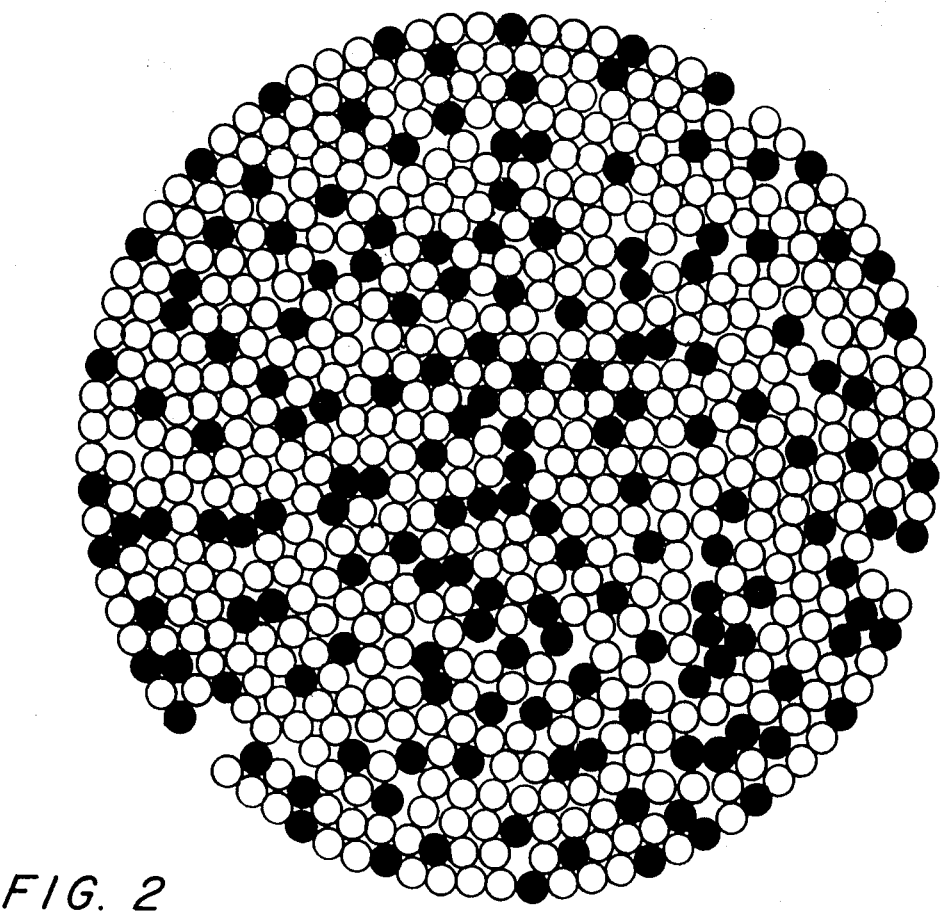
FIG. 2 is an enlarged view of the end of the bifurcated light guide used in the apparatus, which is moved so as to be contiguous with the focal surface of the lens system.

The end surface 12 is shown enlarged in FIG. 2. The fibers which form the set 18 that leads to the light detector are shown darkened while the fibers that form set 16 that lead from the light source 17 are shown light. Thus the light fibers form a random sort of object. The action of the lens and the retroreflector is such as to reimage this random object back onto itself and so it reimages the illuminated fibers back onto themselves. Thus, when the surface 12 is located contiguous with the focal surface of the lens system, a minimum of light diffuses into the neighboring randomly intermixed set of light fibers (the dark fibers) that form set 18 leading to the light detector 19. If, however, the end surface 12 is located a small distance either closer or farther from the lens system than the focal surface of the lens system, the image recreated by the lens and retroreflector will not be focused on the surface 11. As a consequence, the light returned by the lens and retroreflector spreads into the darkened set of fibers 18 and is transmitted to the light detector 19.

The plots in FIG. 3 show the relative output of the light detector 19 plotted against the displacement of the surface 12 of the bifurcated light guide from the flange 4 of the light system. In this case, the lens system is a 50-millimeter focal length lens of high quality and aspherically corrected. Different aperture setting for this lens are indicated by the $f$ numbers. Sharpness of the minimum or nadir in the light output is seen to be an inverse function of the lens aperture setting. At full aperture ($f/1.2$), the light output doubles with a 1- to ½-mil displacement of the end surface 12 from the true focal surface.

As a variation of the apparatus shown in FIG. 1, an opal glass diffusing screen used as a projection screen could be substituted for the detector or photomultiplier 19. By operating the apparatus in much the same manner as before, varying the position of the micrometer screw in the region of the minimum of light output, zonal defects or spherical aberrations as well as chromatic aberrations can be qualitatively assessed using the opal glass diffusing screen and the bifurcated light quide. In this case, the apparatus acts as a projection microscope. This action is a consequence of geometry of optic fibers by which the angle of emerging rays measured from the axis is equal to the angle of entering rays measured from the axis.

Chromatic aberration is quantitatively assessed employing a monochromatic light source for filtering the light which is projected from the light source 17 into the set of fibers 16. For these measurements, the lens aperture is set at a specific value and the micrometer setting corresponding to the minimum of light output to the photomultiplier is measured as a function of the color of the illumination as determined by a monochrometer, or by elements of a set of interference filters, varied over the region of interest.

FIG. 4 illustrates an application of principle of the present invention to focus, for example, a camera, where the object is at a given location and it is desired to focus with a lens system an image of the object on an identified surface which may be film. The lens system 31 is either adjustable or if its focus is fixed, the position of the lens system is adjustable. The position is denoted by the line 32. A bifurcated, randomly intermixed fiber optic light guide 33 is located with its polished end 34 contiguous with a surface 35, defined by the location of film, and a mirror 36 is located at the position 37 of the object. Two sets of fibers 38 and 39, which form the bifurcated light guide 33 (just as already described above with reference to bifurcated light guide 10), lead to light source 40 and light detector 41, respectively. The object distance to position 37 is focused on surface at 35 by either adjusting the focal length of the lens system 31 or moving the lens system along the optical axis 30, so that the position of the lens system denoted by position 32 (the position of the lens flange) is varied. When the light detected is a minimum, focusing is accomplished and a very precise and sharp image of an object located at 37 will be produced on film located at 35. In this case, the object distance is denoted $d_o$ and the image distance id $d'_1$. These distances are related to the focal distance of the lens system for conjugate focus at infinity by the well known lens equation.

The embodiments of the present invention described herein are the best known current uses of the invention and are described by way of illustration. The scope of the invention is set forth in the appended claims, as it is desired to protect all uses of the invention apparent to those skilled in the art, in addition to those described herein.

What is claimed is:

1. Optical apparatus for determining the optical focal distance of a lens system comprising:
   a source of light,
   means for detecting a nadir in the intensity of light incident thereon,
   a focusing lens system,
   means along the optical axis of the lens system on one side thereof which reflects light from one path which is parallel to the optical axis to a parallel oppositely directed path,
   whereby light from the focal plane of the lens system on the other side thereof passes through the lens system, is reflected and focused by the lens system of the focal plane,
   means for directing light from the source to the point,
   means for directing light from the point to the detecting means and
   means for measuring the distance between the point and the lens system,
   whereby the distance measured when the light detected is at a nadir is representative of the focal distance of the lens system.

2. Optical apparatus as in claim 1 and in which the point is located on the optical axis of the lens system.

3. Optical apparatus as in claim 2 and in which the distance between the point and the lens system is variable.

4. Optical apparatus as in claim 1 and in which the means which reflects light from one path to a
parallel oppositely directed path is a retroreflector.

5. Optical apparatus as in claim 1 and in which the means which reflects light from one path to a parallel oppositely directed path is a corner reflector.

6. Optical apparatus as in claim 1 and in which the means which reflects light from one path to a parallel oppositely directed path is a cube corner prism.

7. Optical apparatus as in claim 1 and in which the means for directing light from the source to point and the means for directing light from the point to the detecting means includes a bifurcated optical fiber light guide, one end of which is at the point and from which one set of fibers extends to the source of light and the other extends to the means for detecting light.

8. Optical apparatus as in claim 7 and in which the fibers from each set are intermixed in the bifurcated light guide at the one end.

9. Optical apparatus as in claim 8 and in which the fibers at the one end are randomly intermixed.

10. In optical apparatus for aid in focusing on a given surface an image of an object at a given location the combination comprising:
  a lens system along an optical path between the surface and the position of the object,
  a mirror at the location of the object,
  a source of light,
  means for detecting the intensity of light incident thereon,
  a bifurcated optical fiber light guide, one end of which is contiguous with the surface and from which two sets of fibers extend, one set extends to the source of light and the other extends to the detecting means,
  whereby optimum focusing occurs when the detected intensity is at a nadir.

11. Optical apparatus as in claim 10 and in which means are provided for varying the position of the lens system while monitoring the intensity of the light detected.

12. Optical apparatus as in claim 10 and in which means are provided for varying the focal length of the lens system while monitoring the intensity of light detected.

13. A method for determining a focal surface of a lens system comprising the steps of:
  producing an object on one side of the lens system, the distance between the object and the lens system being variable,
  directing light from the object which is transmitted by the lens system to a retroreflector, and
  detecting the intensity of light from the object which is reflected by the retroreflector through the lens system and which does not fall on the object.

14. A method as in claim 13 and further including the steps of:
  varying the distance between the object and the lens system, and
  selecting the distance at which the intensity of detected light is at nadir.

15. A method for focusing with a lens system an image of an object on a surface comprising the steps of:
  placing a mirror at the position of the object,
  producing a second object on the opposite side of the lens system, the distance between the second object and the lens system being variable,
  directing light from the second object, which is transmitted by the lens system to the mirror, and
  detecting the intensity of light from the second object which is reflected from the mirror through the lens system and which does not fall on the second object.

16. A method as in claim 15 and further including the steps of:
  varying the distance between the second object and the lens system, and
  selecting the distance at which the intensity of the detected light is at a nadir.

17. A method as in claim 16 and further including the steps of:
  directing the lens system at the object and
  disposing a light-sensitive surface at the position of the second object.

* * * * *